(12) United States Patent
Won

(10) Patent No.: US 7,141,902 B2
(45) Date of Patent: Nov. 28, 2006

(54) FLAT TYPE VIBRATION MOTOR

(75) Inventor: Sung Hong Won, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 175 days.

(21) Appl. No.: 10/875,322

(22) Filed: Jun. 25, 2004

(65) Prior Publication Data

US 2005/0184602 A1   Aug. 25, 2005

(30) Foreign Application Priority Data

Feb. 25, 2004   (KR)   .................... 10-2004-0012510

(51) Int. Cl.
*H02K 7/65*   (2006.01)
*H02K 7/75*   (2006.01)
*H02K 7/06*   (2006.01)
*H02K 7/10*   (2006.01)

(52) U.S. Cl. ..................................... 310/81

(58) Field of Classification Search ............ 310/36, 310/66, 68 R, 81, 128, 268, 154.04, 154.05
See application file for complete search history.

(56) References Cited

U.S. PATENT DOCUMENTS

| | | | | |
|---|---|---|---|---|
| 3,993,920 A | * | 11/1976 | Sato ........................... | 310/66 |
| 4,143,288 A | * | 3/1979 | Sato ........................... | 310/66 |
| 4,369,388 A | * | 1/1983 | Ban et al. ................. | 310/154.05 |
| 4,658,162 A | * | 4/1987 | Koyama et al. ........... | 310/68 R |
| 4,804,574 A | * | 2/1989 | Osawa et al. ............... | 428/209 |
| 5,498,919 A | * | 3/1996 | Bahn .......................... | 310/268 |
| 5,581,519 A | * | 12/1996 | Hara et al. .................... | 368/64 |
| 5,793,133 A | * | 8/1998 | Shiraki et al. ............. | 310/81 |
| 6,265,796 B1 | * | 7/2001 | Tezuka ..................... | 310/67 R |
| 6,265,838 B1 | * | 7/2001 | Won .......................... | 318/114 |
| 6,291,915 B1 | * | 9/2001 | Yamaguchi ................ | 310/71 |
| 6,448,677 B1 | * | 9/2002 | Won .......................... | 310/81 |
| 6,479,914 B1 | * | 11/2002 | Yoshida et al. ............ | 310/81 |
| 6,515,400 B1 | * | 2/2003 | Park .......................... | 310/268 |
| 6,566,772 B1 | * | 5/2003 | Yamaguchi ................. | 310/81 |
| 6,674,202 B1 | * | 1/2004 | Yamaguchi ................ | 310/128 |
| 6,806,603 B1 | * | 10/2004 | Choi et al. .................. | 310/81 |
| 6,909,206 B1 | * | 6/2005 | Koyanagi et al. ........... | 310/43 |
| 6,998,742 B1 | * | 2/2006 | Yamaguchi et al. ......... | 310/81 |
| 6,998,743 B1 | * | 2/2006 | Fujii et al. .................. | 310/81 |
| 7,030,523 B1 | * | 4/2006 | Park .......................... | 310/81 |

(Continued)

FOREIGN PATENT DOCUMENTS

JP   11-150918   6/1999

(Continued)

*Primary Examiner*—Karl Tamai
*Assistant Examiner*—Pedro J. Cuevas
(74) *Attorney, Agent, or Firm*—Lowe Hauptman & Berner, LLP.

(57) ABSTRACT

Disclosed is a flat type vibration motor, in which a shaft is supported between a housing and a bracket. A rotor includes an upper board, A and B phase winding coils, an eccentric weight and a rectifier. The rectifier has a plurality of segments electrically connected to first and second ends of the A and B phase winding coils. A stator includes a lower board, a magnet and a pair of brush fingers electrically connected to a power supply and in contact with the segments. A pattern coil on the upper board electrically connects between a segment connected to a first end of the A phase winding coil and another segment connected to a second end of the B phase winding coil to generate electromagnetic force for rotating the rotor from an electrically disconnected section to an electrically connected section.

8 Claims, 13 Drawing Sheets

U.S. PATENT DOCUMENTS

| | | | |
|---|---|---|---|
| 7,049,721 B1 * | 5/2006 | Yamaguchi et al. | 310/81 |
| 2004/0084980 A1 * | 5/2004 | Yamaguchi et al. | 310/81 |
| 2004/0135444 A1 * | 7/2004 | Choi et al. | 310/81 |
| 2005/0264114 A1 * | 12/2005 | Park | 310/81 |

FOREIGN PATENT DOCUMENTS

| | | | | |
|---|---|---|---|---|
| JP | 2004129319 | A | * | 4/2004 |
| JP | 2006068593 | A | * | 3/2006 |
| JP | 2006094643 | A | * | 4/2006 |
| JP | 2006094644 | A | * | 4/2006 |
| JP | 2006101601 | A | * | 4/2006 |
| JP | 2006101667 | A | * | 4/2006 |
| KR | 2003-0048582 | | | 6/2003 |
| KR | 10-2004-0000935 | | | 1/2004 |

* cited by examiner

FLAT TYPE VIBRATION MOTOR

CLAIM OF PRIORITY

This application claims the benefit of Korean Patent Application No. 2004-12510 filed on Feb. 25, 2004, in the Korean Intellectual Property Office, the disclosure of which is incorporated herein by reference.

BACKGROUND OF THE INVENTION

1. Field of the Invention

The present invention relates to a flat type vibration motor, more particularly, which is so structured to prevent any stoppage in the initialization or operation thereof to realize efficient and stable initialization and operation. The present invention also relates to a flat type vibration motor capable of incorporating a single winding coil therein to simplify an assembly process thereby saving labor cost and material cost as well as simplify an assembly structure thereby saving manufacturing cost.

2. Description of the Related Art

Communication instruments generally use bells and vibrators to inform users of call incoming. In a vibration mode, a small-sized vibration motor is typically operated to transfer driving force to a housing of a communication instrument thereby vibrating the whole communication equipment.

A vibration motor applied to the communication instrument such as a mobile phone is classified into a flat type (or a coin type) vibration motor and a cylinder type (or a bar type) vibration motor.

The flat type vibration motor facilitates the miniaturization of mobile phone parts because it can be fabricated in a relatively thin and simple structure for generating vibration, for example, in which a weight is placed inside the motor to be rotated along with a rotor. Owing to these advantages, the coverage of the flat type vibration motor is gradually increasing.

FIG. 1 is a longitudinal sectional view of a general flat type vibration motor. As shown in FIG. 1, a conventional flat type motor 1 generally includes a rotor member or a rotor assembly (hereinafter will be referred to as "rotor") 10, a stationary member or stator assembly (hereinafter will be referred to as "stator") 20 and a housing 30 containing both the rotor 10 and the stator 20.

The rotor 10 is of an eccentric rotational structure which is rotatably assembled within the housing 30, and has coils 12 and 14 of wires wound around cores by a number of times, respectively, on a top board 11 without a pattern circuit and a weight 13 eccentrically arranged adjacent to the winding coils 12 and 14. The winding coils 12 and 14 and the weight 13 are molded within an insulation material 16, which is insert molded to protect the winding coils 12 and 14 and the weight 13 from the external environment.

The rotor 10 also has a rectifier 15 on the underside of the top board 11, in which the rectifier 15 is radially divided into a plurality of segments 15a to 15d at a predetermined gap and has a contact face exposed downward. Some of the segments 15a to 15d of the rectifier 15 perform elastic contact with the upper ends of the positive and negative brush fingers 25a and 25b of a brush 25 arranged in a stator 20.

The stator 20 is of a fixed structure arranged on a bracket 35 which is assembled to the housing 30 to close the opened bottom of the housing 30. In the stator 20, a rim-shaped magnet 22 of N and S poles radially alternating with each other is arranged on a bottom board 21 placed on the bracket 35, and a power supply 23 for electrically connecting the brush 25 with lead wires 24a and 24b for supplying external voltage includes positive and negative terminals 23a and 23b that are arranged on an upper face portion of the bottom board 21.

The brush 25 is divided into the positive and negative brush fingers 25a and 25b, which are electrically connected to the positive terminal 23a and the negative terminal 23b of the power supply 23, respectively, so as to be supplied with positive and negative voltages of different polarity, respectively.

Next, a shaft 31 erected from the top center of the bracket 35 is inserted into the rotor 10, and rotatably assembled to the rotor 10 via a bearing member 32 that is integral to the rotor 10. The shaft 31 is supported by upper and lower ends to the underside of the housing 30 and the top of the bracket 35, respectively.

In the operation of the vibration motor 1 of the above structure, an input voltage from the power supply 23 of the stator 20 is supplied to the rectifier 15 via the brush 25. More specifically, the voltage is alternatingly supplied to the winding coils 12 and 14 through the selective contact between the brush 25 divided into the positive and negative brush fingers and the rectifier 15 divided into plural parts corresponding to the brush 25.

The interaction between the winding coils 12 and 14 and the magnet 22 drives the rotor 10 to rotate about the shaft 31 in a predetermined direction. At this time, the rotor 10 eccentrically rotates about the shaft 31 generating lateral pressure, which in turn is transmitted in the form of vibration to the housing 30 and the bracket 35 that support the shaft 31 at the top and bottom so that a user can feel call incoming.

According to a conventional method for powering the winding coils 12 and 14 through the contact between the brush fingers 25a and 25b of the brush 25 and the segments 15a to 15d of the rectifier 15 to operate the motor as above, it is required to align the positive and negative brush fingers 25a and 25b steadily and correctly with segments 15a and 15c connected to both ends of the winding coil 12 and the segments 15b and 15d connected to both ends of the winding coil 14, respectively, according to an electrical angle θ determined by the number of the segments 15a to 15d.

However, in the initialization or operation of the vibration motor of the above structure, if any one (for example 25b) of the positive and negative brush fingers 25a and 25b is offset from the preset electrical angle θ to contact any adjacent segment 15b or 15d as shown in dotted lines instead of contacting the segment 15c, thereby opening the electric circuit for electrically connecting the winding coils 12 and 14. Then, a dead point as an electrically disconnected section for temporarily interrupting power supply takes place to bring a temporary or complete stoppage to the initialization or operation of the motor, thereby producing a fatal problem of disabling the motor.

Such stoppage may be induced from defective assembly processes or design errors hindering the rectifier 15 and the brush 25 from being precisely assembled so that the segments 15a to 15d fail to steadily perform uniform contact with the brush fingers 25a and 25b at a predetermined electrical angle of 90 or 180°. Otherwise, the stoppage may take place in case that the brush 25 is deformed under the impact while passing through respective gaps defined by the segments 15a to 15d so as to change the contact position with respect to the rectifier 15.

As a consequence, there is proposed a conventional scheme as shown in FIG. 3 in order to prevent the stoppage of the motor originated from the dead point, by which the winding coils 12 are provided with double coils 12a, 12b, 14a and 14b, respectively, and the series-connected coils 12a and 12b are wired with the series-connected coils 14a and 14b to have a neutral point N at a common connection point thereof to provide an electric circuit capable of maintaining electric connection without a dead point even though the positive and negative brush fingers 25a and 25b are offset from the preset electrical angle θ.

However, according the conventional scheme of forming the neutral point N through the double winding of the winding coils 12 and 14, respectively, to prevent the dead point, because the winding coils 12 and 14 are double-wound with a winder (not shown), and then the double coils 12a, 12b, 14a and 14b of the winding coils 12 and 14 are necessarily arranged by a worker, the winding and arranging operations become very troublesome to degrade workability as well as increase coil consumption thereby to raise manufacturing cost.

SUMMARY OF THE INVENTION

The present invention has been made to solve the foregoing problems of the prior art and it is therefore an object of the present invention to provide a flat type vibration motor capable of preventing any stoppage in the initialization or operation thereof to realize efficient and stable initialization and operation.

It is another object of the invention to provide a flat type vibration motor capable of incorporating a single winding coil in a rotor to simplify an assembly process and save manufacturing cost.

According to an aspect of the invention for realizing the object, there is provided a flat type vibration motor comprising: a shaft supported between a housing and a bracket assembled to a bottom of the housing; a rotor including an upper board arranged within the housing, A and B phase winding coils arranged on a top of the upper board, a weight arranged eccentrically on the top of the upper board adjacent to the winding coils and a rectifier arranged on an underside of the upper board, the rectifier having a plurality of segments electrically connected to first and second ends of the A and B phase winding coils, respectively; a stator including a lower board, a magnet arranged on a top of the lower board corresponding to the A and B winding coils and a pair of brush fingers electrically connected to a power supply for receiving external voltage and in contact with the segments; and a pattern coil arranged on the upper board for achieving electric connection between one of the segments connected to a first end of the A phase winding coil and another one of the segments connected to a second end of the B phase winding coil in order to generate electromagnetic force for rotating the rotor from an electrically disconnected section to an electrically connected section.

Preferably, each of the A and B winding coils may comprise a single coil member wound in a number of times.

Preferably, the upper board may comprise a printed circuit board with the segments and the pattern coil being printed on an underside thereof.

Preferably, the rotor further includes an insulator formed on the top of the upper board for integrally molding the winding coils and the weight therein.

Preferably, the lower board may comprise a printed circuit board having a pattern circuit printed on a top thereof for electrically connecting the power supply with the brush fingers.

Preferably, the magnet may comprise an annular magnet member having N and S poles radially magnetized in an alternating fashion.

Preferably, the pattern coil may comprise at least one coil formed in the underside of the upper board corresponding to an either one of the A and B winding coils.

More preferably, the pattern coil formed on the underside corresponding to an either one of the A and B winding coils is wound in a direction the same as that of the corresponding winding coil.

According to another aspect of the invention for realizing the object, there is provided a flat type vibration motor comprising: a shaft supported between a housing and a bracket assembled to a bottom of the housing; a rotor including an upper board arranged within the housing, A and B phase winding coils arranged on a top of the upper board, a weight arranged eccentrically on the top of the upper board adjacent to the winding coils and a rectifier arranged on an underside of the upper board, the rectifier having a plurality of segments electrically connected to first and second ends of the A and B phase winding coils, respectively; a stator including a lower board, a magnet arranged on a top of the lower board corresponding to the A and B winding coils and a pair of brush fingers electrically connected to a power supply for receiving external voltage and in contact with the segments; and a bypass circuit including a first passive device provided in a longitudinally intermediate portion of a first pattern coil, which electrically connects a first one of the segments connected to a first end of the A phase winding coil with a second one of the segments connected to a second end of the B phase winding coil, and a second passive device provided in a longitudinally intermediate portion of a second pattern coil, which electrically connects a third one of the segments connected to a second end of the A phase winding coil with a fourth one of the segments connected to a first end of the B phase winding coil, so as to create rotating force for rotating the rotor from an electrically disconnected section to an electrically connected section.

Preferably, each of the A and B phase coils may comprise a single coil member wound in a number of times.

Preferably, the upper board may comprise a printed circuit board with the segments and the pattern coil being printed on an underside thereof.

Preferably, the rotor further includes an insulator formed on the top of the upper board for integrally molding the winding coils and the weight therein.

Preferably, the lower board may comprise a printed circuit board having a pattern circuit printed on a top thereof for electrically connecting the power supply with the brush fingers.

Preferably, the magnet may comprise an annular magnet member having N and S poles radially magnetized in an alternating fashion.

Preferably, each of the first and second passive devices may comprise a resistor.

Preferably, each of the first and second passive devices may comprise an inductor.

More preferably, each of the first and second passive devices may comprise a capacitor.

BRIEF DESCRIPTION OF THE DRAWINGS

The above and other objects, features and other advantages of the present invention will be more clearly understood from the following detailed description taken in conjunction with the accompanying drawings, in which:

FIGS. 2A and 2B are illustrations of a general flat type vibration motor, in which FIG. 2A is a bottom view illustrating segments of a rectifier in contact with positive and negative brushes, and FIG. 2B illustrates the contact state between the segments of the rectifier and the positive and negative brushes;

FIGS. 6A and 6B are illustrations of the flat type vibration motor according to the first embodiment of the invention, in which FIG. 6A illustrates a brush in normal contact with a rectifier, and FIG. 6B illustrates the brush in abnormal contact with the rectifier stopping the vibration motor;

FIGS. 10A and 10B are illustrations of the flat type vibration motor according to the second embodiment of the invention, in which FIG. 10A illustrates a brush in normal contact with a rectifier, and FIG. 10B illustrates the brush in abnormal contact with the rectifier disabling the operation of the vibration motor;

FIGS. 11A and 11B are circuit diagrams of the flat type vibration motor according to the second embodiment of the invention, in which FIG. 11A illustrates an electrically connected section, and FIG. 11B illustrates an electrically disconnected section;

FIGS. 13A to 13C are graphs illustrating torque wave profiles occurring from the flat type vibration motor according to the second embodiment of the invention, in which FIG. 13A illustrates a wave profile in which passive devices are of resistor means or inductors, FIG. 13B illustrates a resultant wave profile of torques of the A and B winding coils, and FIG. 13C illustrates a wave profile in which the passive devices are of capacitors.

DETAILED DESCRIPTION OF THE PREFERRED EMBODIMENT

Preferred embodiments of the present invention will now be described in detail with reference to the accompanying drawings.

Figure 1:
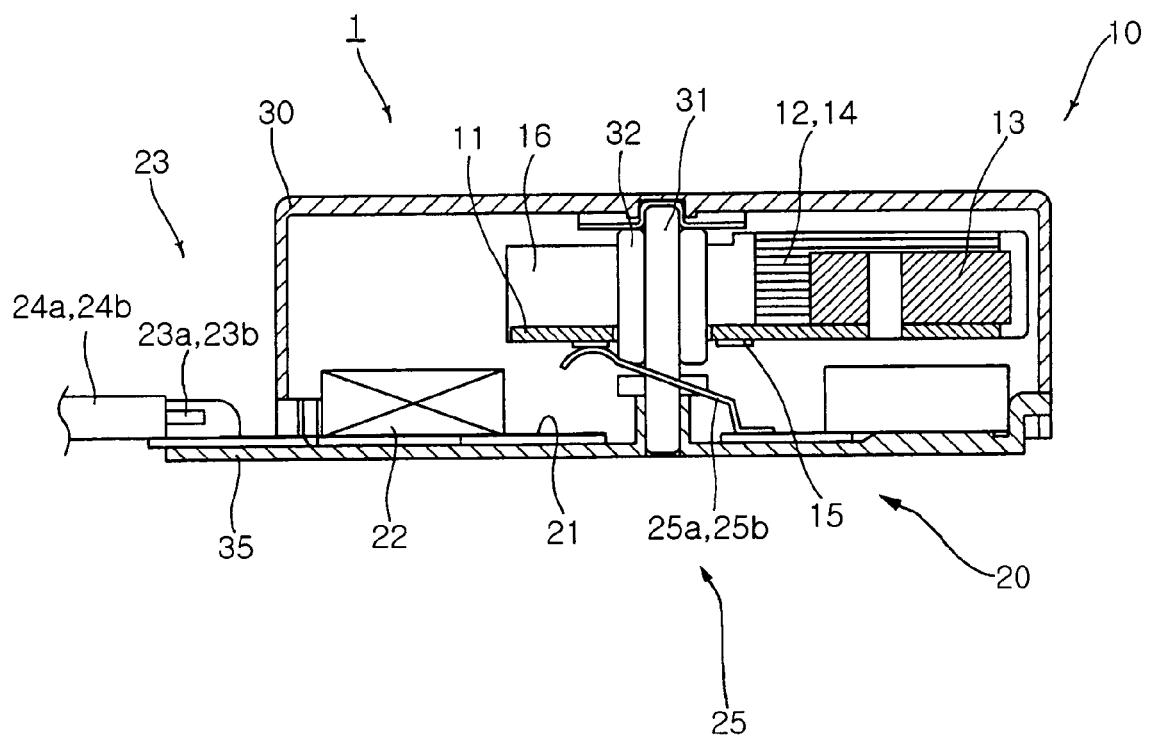
FIG. 1 is a longitudinal sectional view of a general flat type vibration motor.
Figure 2A:
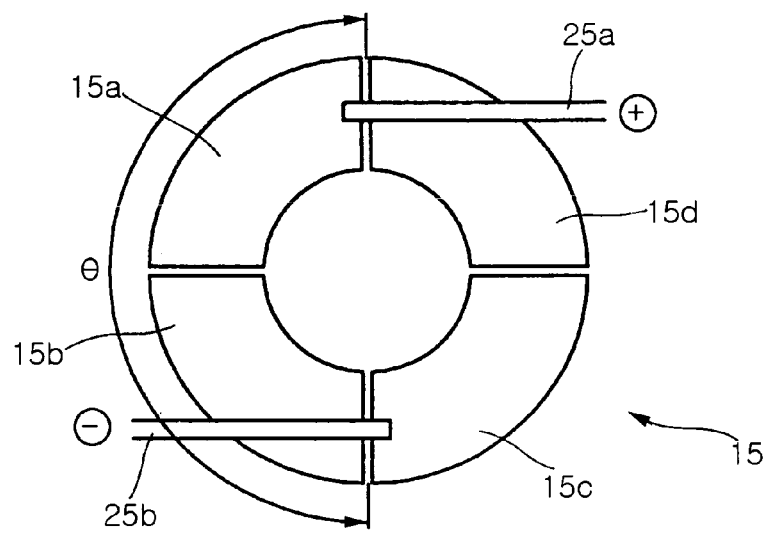
Figure 2B:
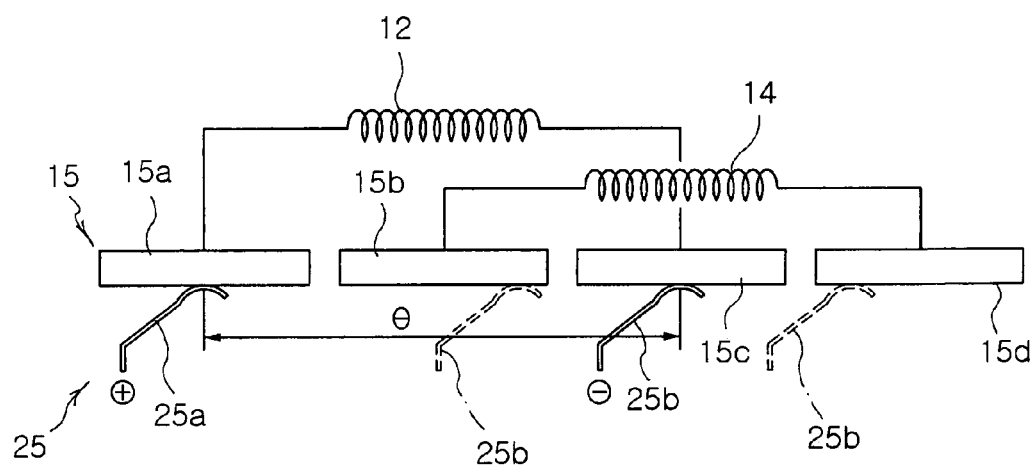
Figure 3:
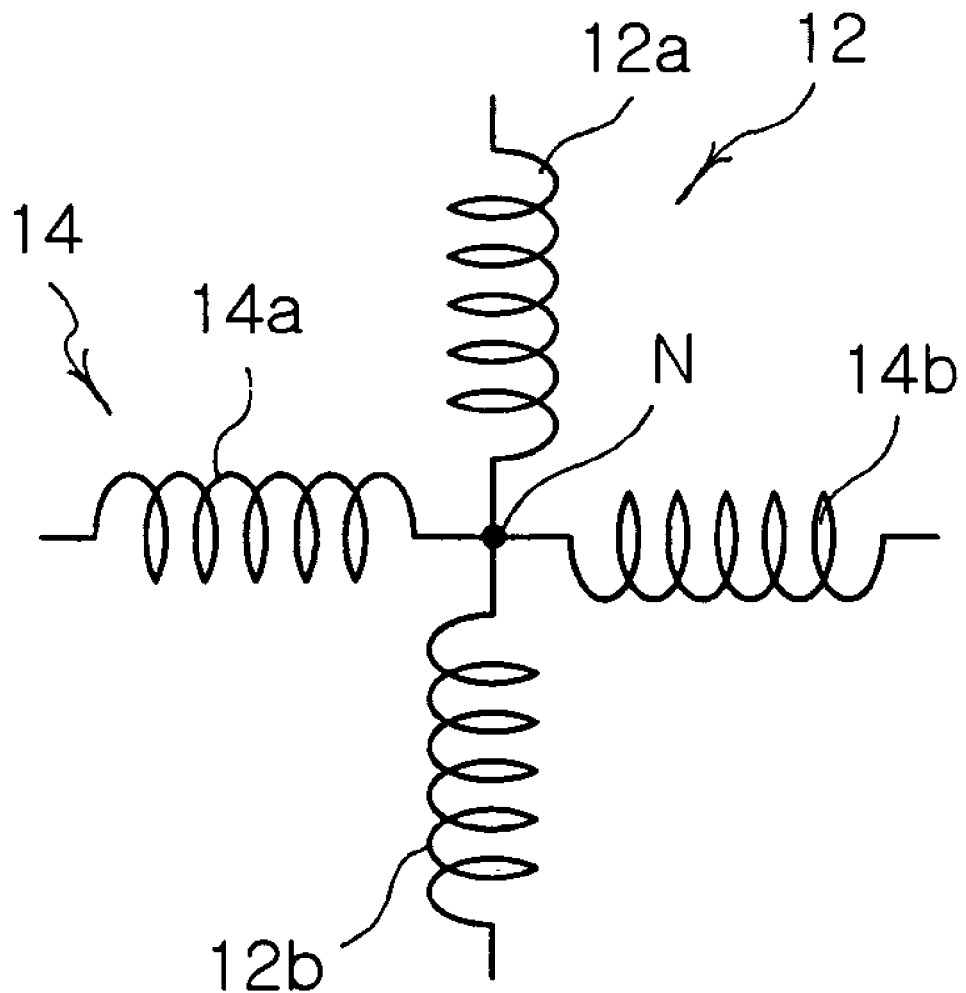
FIG. 3 is an illustration of the wiring of double winding coils for preventing a dead point in a general flat type vibration motor.
Figure 4:
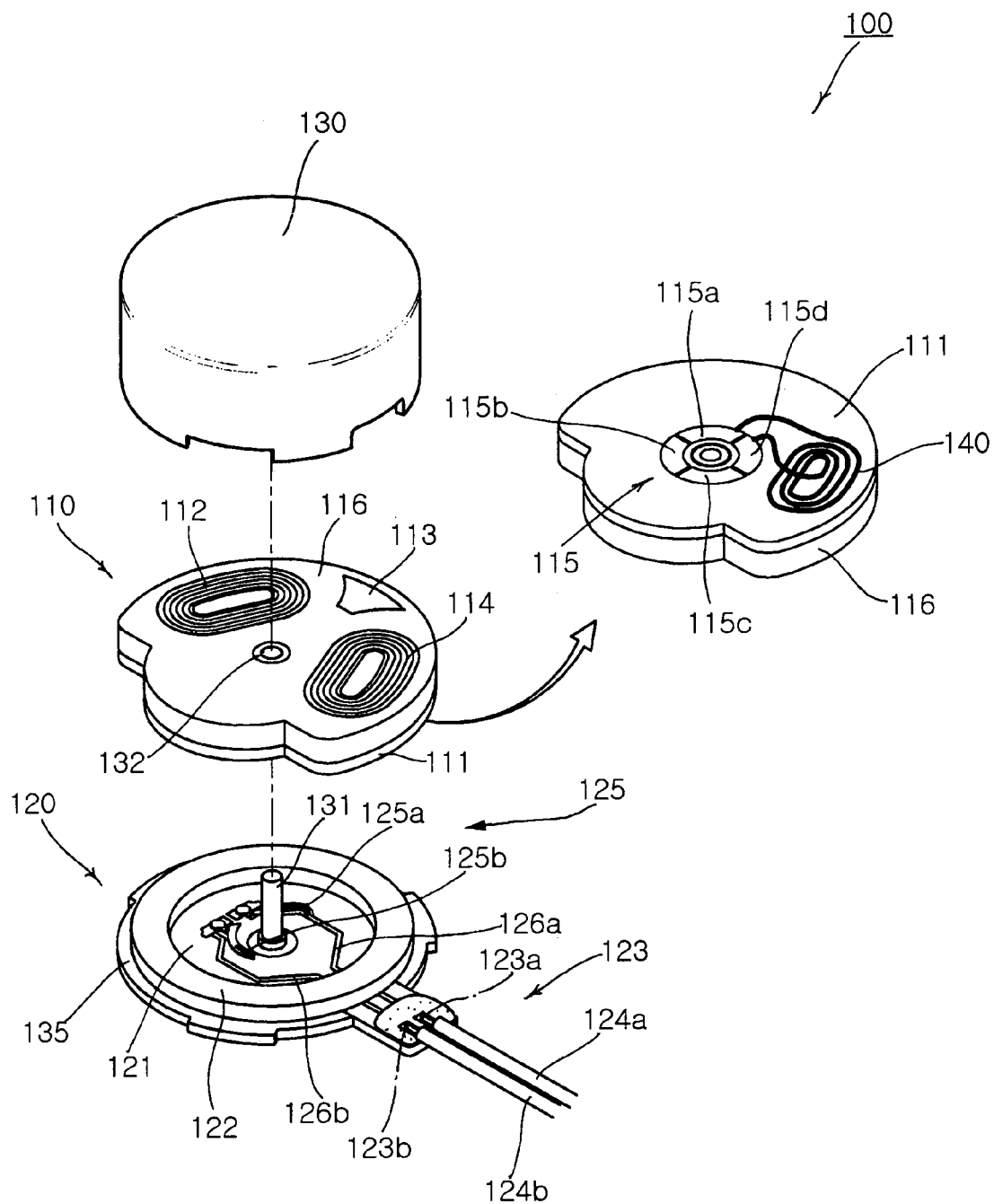
FIG. 4 is an exploded perspective view illustrating a flat type vibration motor according to a first embodiment of the invention.
Figure 5:
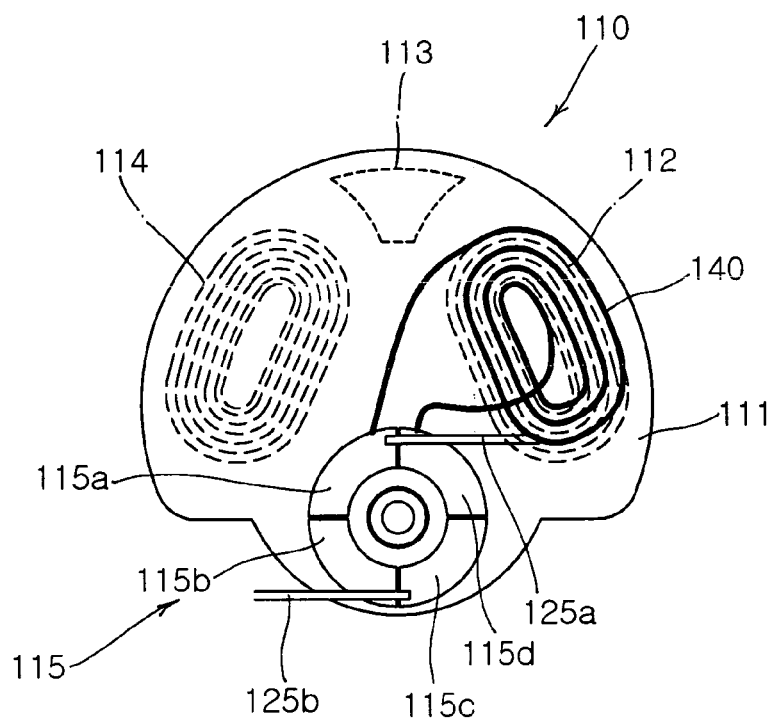
FIG. 5 is a bottom view of a rotor adopted in the flat type vibration motor according to the first embodiment of the invention.
Figure 6A:
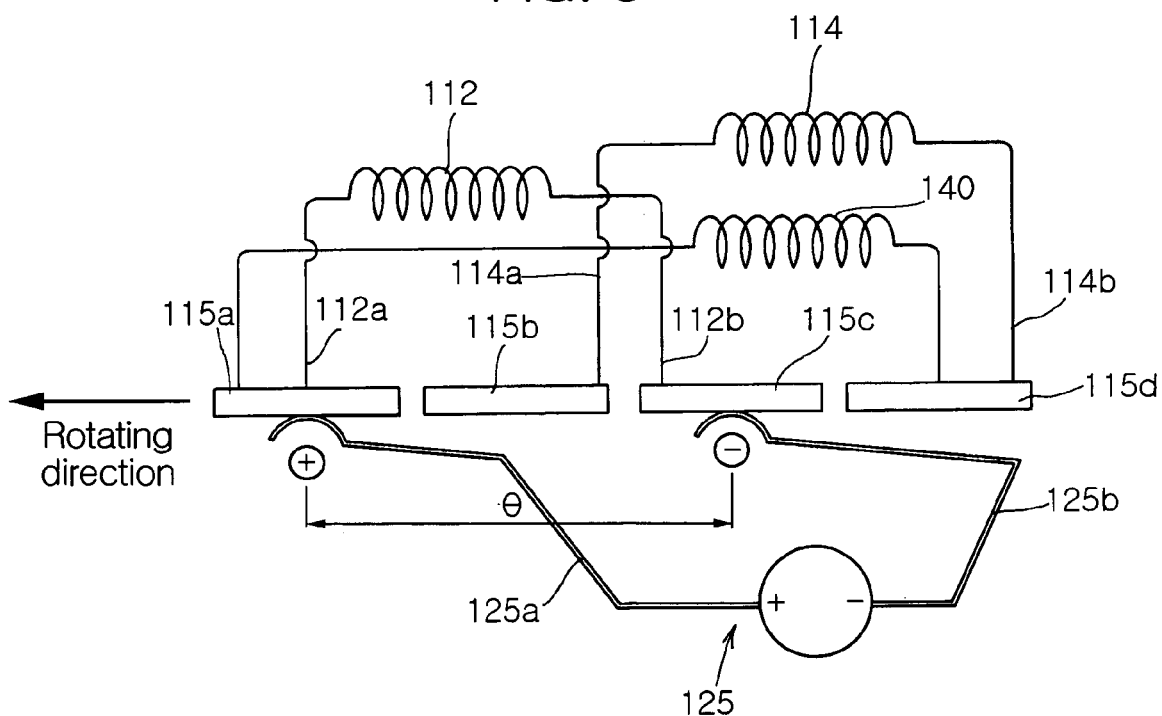
Figure 6B:
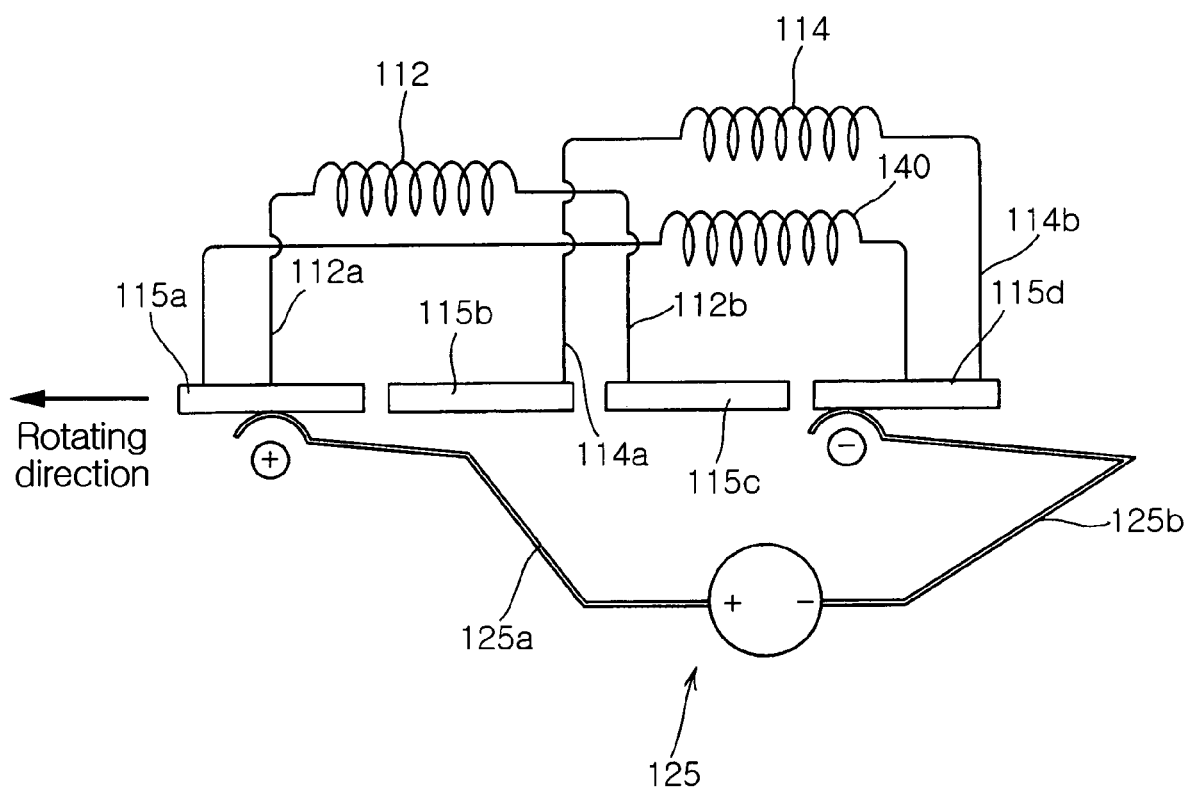

FIG. 4 is an exploded perspective view illustrating a flat type vibration motor according to a first embodiment of the invention, FIG. 5 is a bottom view of a rotor adopted in the flat type vibration motor according to the first embodiment of the invention, and FIGS. 6A and 6B are illustrations of the flat type vibration motor according to the first embodiment of the invention, in which FIG. 6A illustrates a brush in normal contact with a rectifier, and FIG. 6B illustrates the brush in abnormal contact with the rectifier disabling the operation of the vibration motor.

As shown in FIG. 4, a flat type vibration motor 100 of the invention includes a rotor 110, a stator 120 and a housing 130 in order to generate vibration by using lateral pressure induced from a shaft 131 when the eccentric rotor 110 rotates about the stator 120 at the application of a voltage.

That is, the rotor 110 is of a rotational structure that is eccentrically and rotatably assembled with the shaft 131 via a bearing member 132, in which the shaft 131 is supported by both ends between the bottom of the housing 130 and the top of the bracket 135 for coupling with the bottom of the housing 130 to close the inner space of the housing 130.

The rotor 110 has an "A" phase winding coil 112 and a "B" phase winding coil 114 arranged on the top of an upper board 111 placed within the housing 130 and a weight 113 of high mass such as tungsten (W) eccentrically placed between or adjacent to the A and B phase winding coils 112 and 114, in which the A and B phase winding coils 112 and 114 and the weight 113 are integrally provided on the top of the upper board 111 within an insulator 116 that is made from insulating material such as resin. Then, the rotor 110 assembled to the shaft 131 via the bearing member 132 has an eccentric gravity center so that it can be eccentrically rotated when actuated.

The A and B phase winding coils 112 and 114 are formed by coiling single wires in a single direction for a number of times, respectively, so as to simply and rapidly perform those operations of coiling the wires with a winder (not shown) and connecting both ends 112a, 112b, 114a and 114b of the winding coils 112 and 114 with segments 115a to 115d of a rectifier 115, respectively.

In the rectifier 115 arranged on the underside of the upper board 111, the segments 115a to 115d associated with the A and B phase winding coils 112 and 114 are radially arranged at a uniform gap.

The upper board 111 having the A and B phase winding coils 112 and 114, the weight 113 and the insulator 116 may be provided in the form of a Printed Circuit Board (PCB) so that the segments 115a to 115d of the rectifier 115 are printed on the underside of the PCB.

The both ends 112a and 112b of the A phase winding coil 112 are electrically connected to the segments 115a and 115c of the rectifier 115, respectively, and the both ends of the B phase winding coil 114 are electrically connected to the segments 115b and 115d of the rectifier 115, respectively. In the meantime, the segments 115a to 115d alternatingly contact the positive and negative brush fingers 125a and 125b, respectively, which are oriented at a predetermined electrical angle θ.

Then, the electrical angle θ of the positive and negative brush fingers 125a and 125b is determined 90 or 180° according to the number of the segments 115a to 115d of the rectifier 115.

The stator 120 has a lower board 121 and a magnet 122 arranged on the top of the bracket 135, in which the magnet 122 is a permanent magnet placed on the top of the bracket 135 opposed to the winding coils 112 and 114, and having N and S poles being alternatingly and radially magnetized in the number of 2, 4, 6, . . . or 2n. The number of magnetic poles of the magnet 122 is preferably determined 2 to 6 in order to simplify the constitutional structure regarding that the number of internal parts increases in proportion with the number of magnetic poles.

At one end of the lower board 121, a power supply 123 is electrically connected to leads 124a and 124b to supply external voltage, and divided into positive and negative terminals 123a and 123b through which different polarity currents flow, respectively.

A brush 125 is placed on the top of the lower board 121 between the rotor 110 as a rotational member and the stator 120 as a stationary member. The brush 125 is electrically connected at the bottom with the positive and negative terminals 123a and 123b of the power supply 123 via positive and negative circuit patterns 126a and 126b, and at the top with the undersides of any of the segments 115a to 115d in an alternating fashion.

The lower board 121 is of a PCB with the positive and negative circuit patterns 126a and 126b being printed on the top thereof for electrically connecting the positive and negative terminals 123a and 123b of the power supply 123 with the positive and negative brush fingers 125a and 125b of the brush 125, respectively.

The positive and negative brush fingers 125a and 125b are preferably inclined at predetermined angle with their tops being placed higher than the topmost surface of the magnet 122 so that the tops of negative brush fingers 125a and 125b can steadily maintain elastic contact with the rectifier 115.

On the underside of the upper board 111 having the rectifier 115, there is provided a pattern coil 140 which functions to generate electromagnetic force for rotating the rotor 110 in a rotating direction to an electrically connected section in the occurrence of an electrically disconnected section owing to a dead point.

The pattern coil 140 is wound in the form of a coil on the underside of the upper board 111, and both ends of the pattern coil 140 are connected to the segments 115a and 115d so that the segment 115a connected to the first end 112a of the A phase winding coil 112, formed by coiling a single coil by a number of times on the top of the upper board 111, is electrically connected to the segment 115d connected to the second end 114b of the B phase winding coil 114.

With the pattern coil 140 of the above structure formed on the underside of the upper board 111 corresponding to the A phase winding coil 112 or the B phase winding coil 114, the vibration motor 100 can be normally operated while the rotor 110 is turned around the stator 120 by the flow of alternate current toward the A phase winding coil 112 and the B phase winding coil.

That is, as shown in FIG. 6A, when the positive and negative brush fingers 125a and 125b of the brush 125 contact the segments 115a to 115d of the rectifier 115 while maintaining a predetermined electrical angle θ, the tops of the positive and negative brush finger 125a and 125b contact the undersides of the segments 115a and 115c connected to the both ends of the A phase winding coil 112, respectively, so that voltage from the power supply 123 forms a series of current flow which is directed from the A phase winding coil 112 first end 112a toward the A phase winding coil 112 second end 112b but does not flow in the B phase winding coil 114.

In succession, if the positive and negative brush fingers 125a and 125b contact the segments 115b and 115d while maintaining the electrical angle θ, current flows through the B phase winding coil 114 but not through the A phase winding coil 112. As a consequence, the alternate current applied to the A and B phase winding coils 112 and 114 forms an alternating electromagnetic field, which in turn interacts with the magnet 122 to rotate the eccentric rotator 110 about the shaft 131 of the stator 120 generating vibration.

On the contrary, as shown in FIG. 6B, if the positive and negative brush fingers 125a and 125b contact the segments 115a to 115d of the rectifier 115 without maintaining the preset electrical angle θ, the positive brush finger 125a contacts the bottom of the segment 115a connected to the first end 112a of the A phase winding coil 112 but the negative brush finger 125b does not contact the bottom of the segment 115c connected to the second end 112b while offsetting from the preset electrical angle θ so that voltage from the power supply 123 fails to form a series of current flow directed from the A phase winding coil 112 first end 112a toward the A phase winding coil 112 second end 112b, resultantly producing an electrically disconnected section as a factor of the stoppage.

Upon the electrical disconnection of the A phase winding coil 112, the negative brush finger 125b offset from the present electrical angle θ is in contact with the segment 115d connected to the second end of the B phase winding coil 114 second end 114b but the positive brush finger 125a is in contact with the segment 115a connected to the first end 112a of the A phase winding coil 112.

Figure 7:
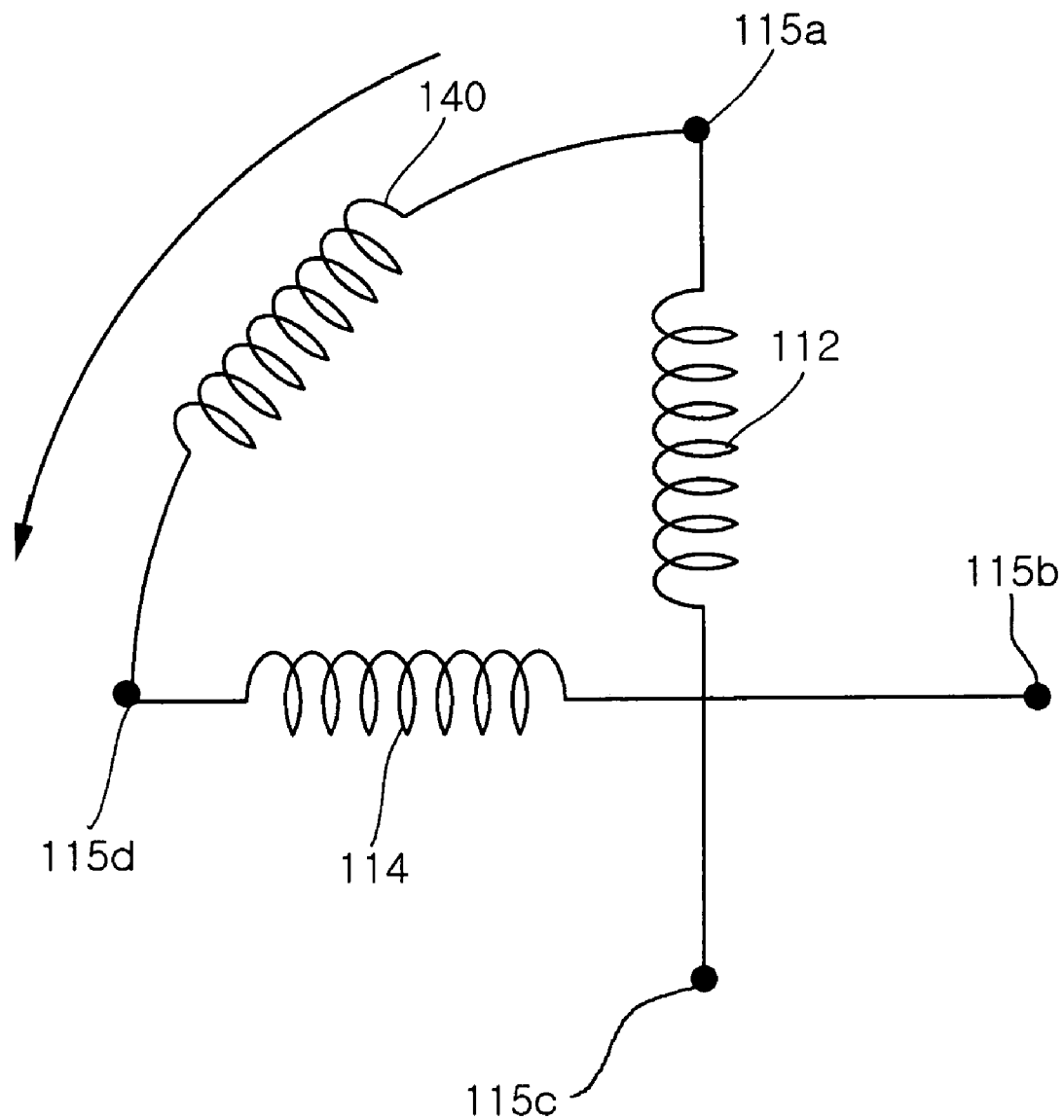
FIG. 7 illustrates winding coils wired with a pattern coil in the flat type vibration motor according to the first embodiment of the invention.

As a consequence, as shown in FIG. 7, input voltage via the positive brush finger 125a in contact with the segment 115a forms a series of output current flow via the negative brush finger 125b in contact with the segment 115d, thereby to generate an electromagnetic field from the pattern coil 140 connecting the segments 115a and 115b together.

Although a rotational torque generated through the interaction between the pattern coil 140 and the magnet 122 is smaller than a normal rotational torque, the rotor 110 can be shifted under the rotational torque from the electrically disconnected section to the electrically connected section where it can easily rotate, thereby to stably actuate the motor.

The pattern coil 140 is of at least one pattern member formed on the underside of the upper board 111 corresponding to the A or B phase winding coil 112 or 114, and thus necessarily wound in a direction the same as that of the corresponding winding coil 112 or 114.

Figure 8:
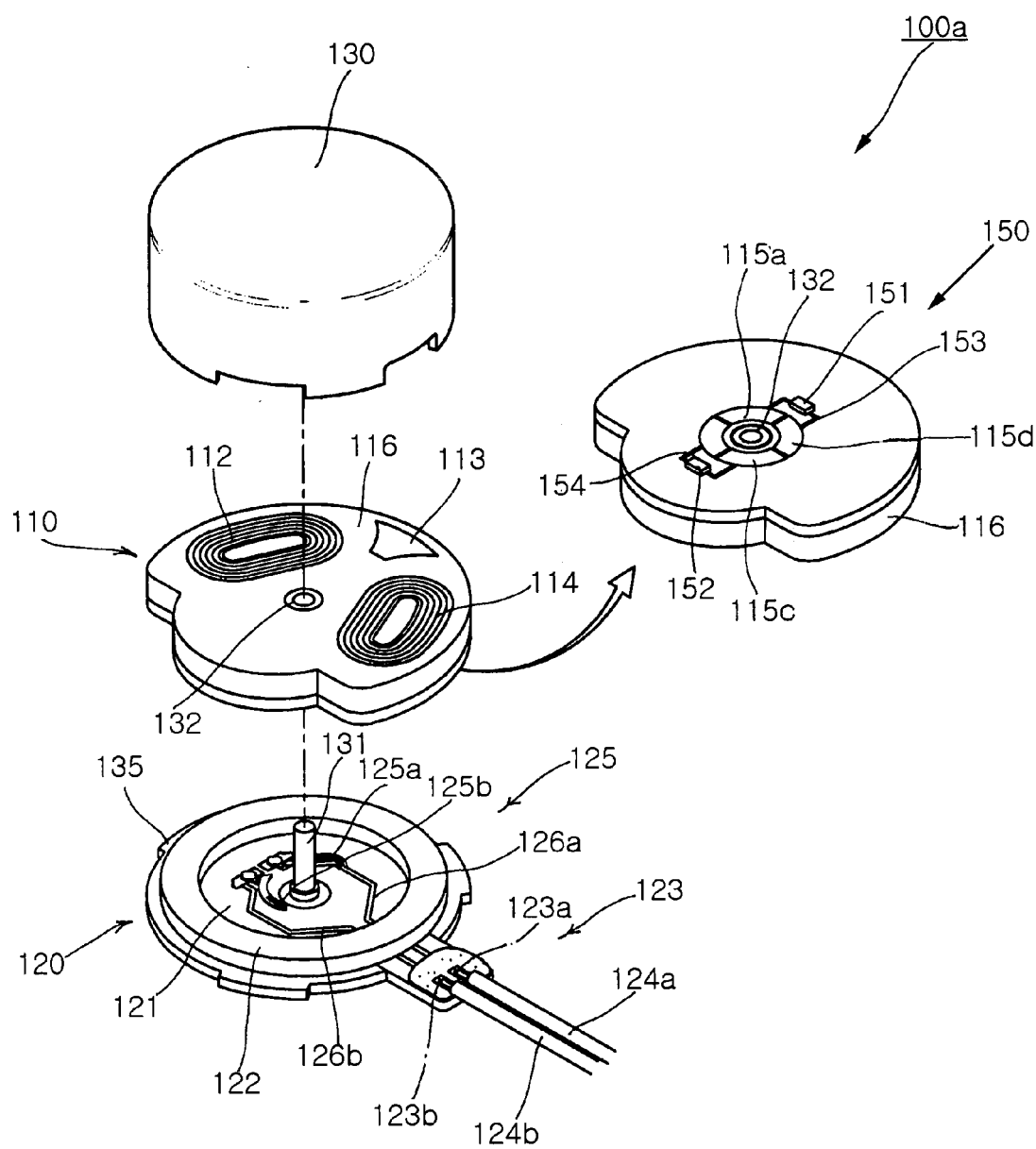
FIG. 8 is an exploded perspective view illustrating a flat type vibration motor according to a second embodiment of the invention.
Figure 9:
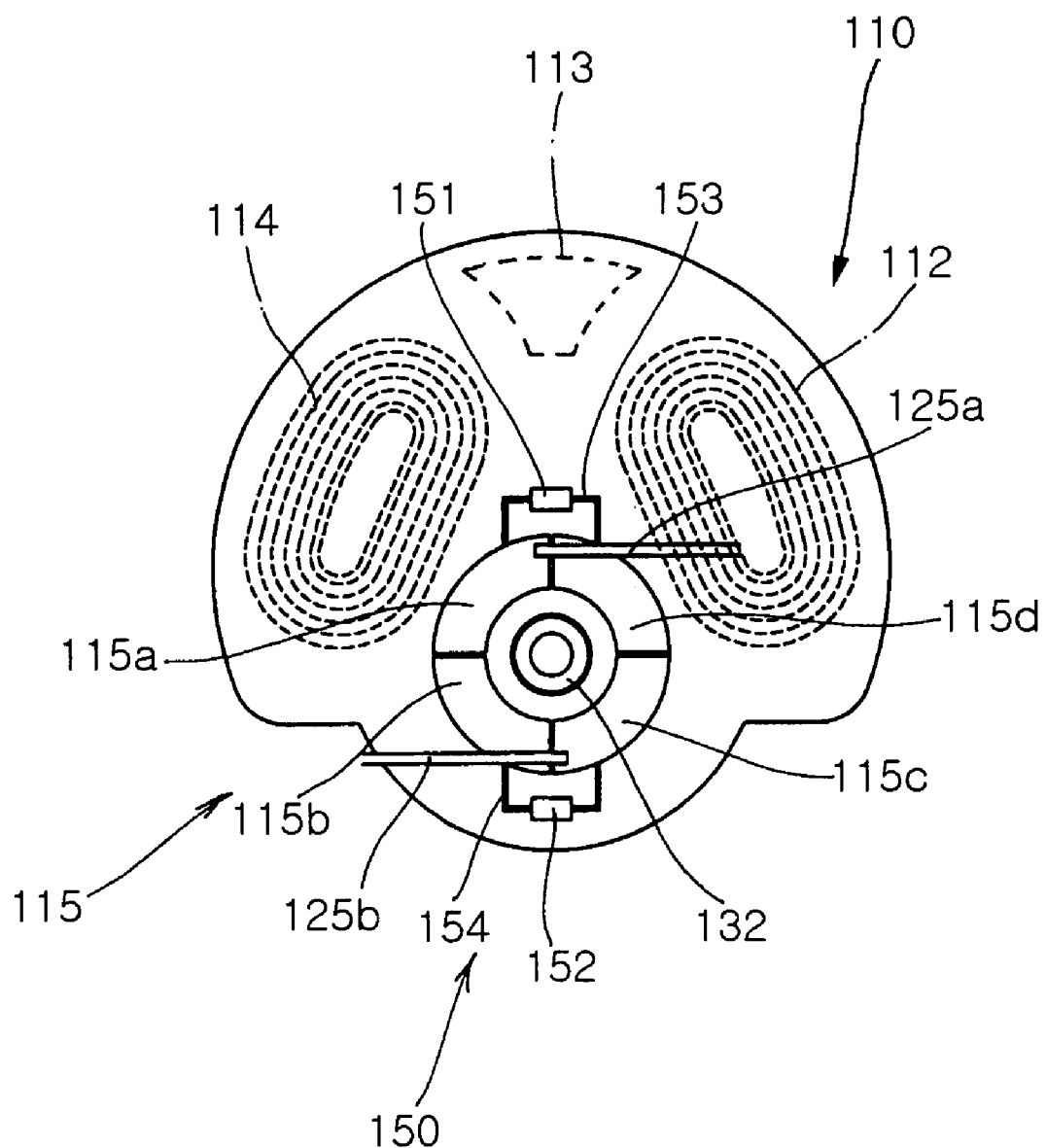
FIG. 9 is a bottom view illustrating a rotor adopted in the flat type vibration motor according to the second embodiment of the invention.
Figure 10A:
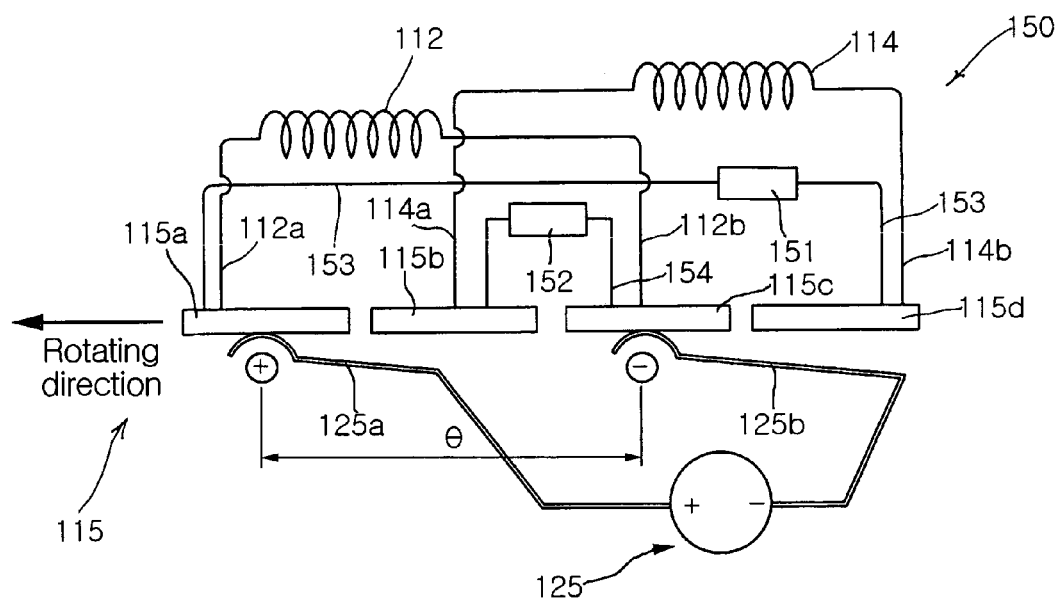
Figure 10B:
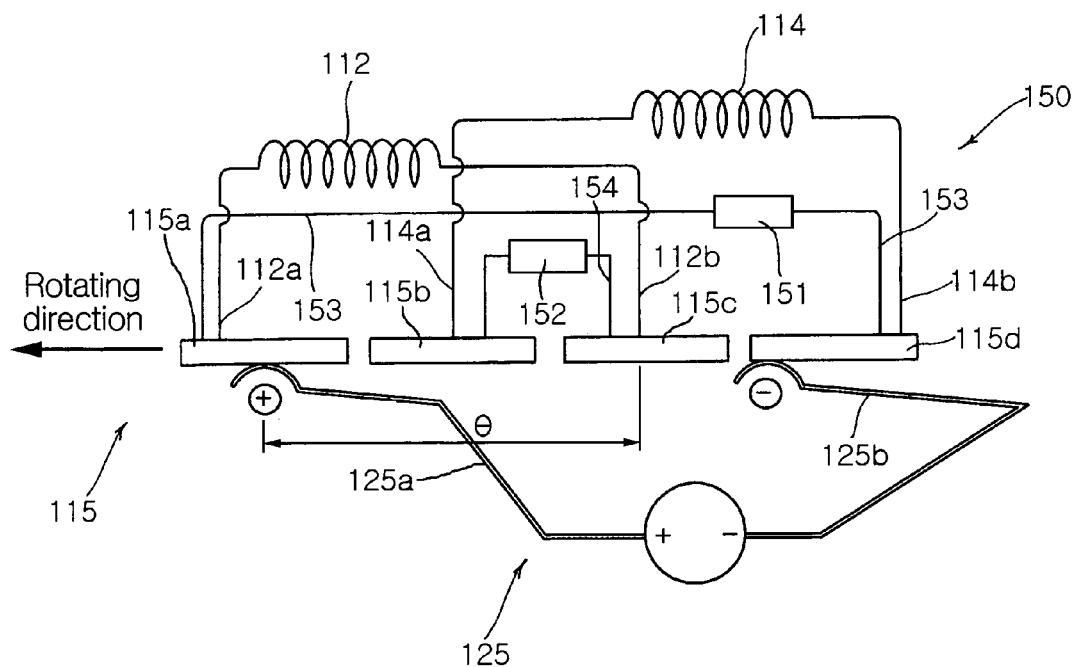

FIG. 8 is an exploded perspective view illustrating a flat type vibration motor according to a second embodiment of the invention, FIG. 9 is a bottom view illustrating a rotor adopted in the flat type vibration motor according to the second embodiment of the invention, and FIGS. 10A and 10B are illustrations of the flat type vibration motor according to the second embodiment of the invention, in which FIG. 10A illustrates a brush in normal contact with a rectifier, and FIG. 10B illustrates the brush in abnormal contact with the rectifier disabling the operation of the vibration motor.

As shown in FIGS. 8 to 10, a vibration motor 100a of this embodiment has the substantially same structure as that of the vibration motor 100 having the rotor 110, the stator 120 and the housing 130, in which the same parts will be designated with the same reference numerals without the detailed description thereof.

According to a technical feature of this embodiment, the vibration motor 100a includes a pattern circuit 153 with a first passive device 151 connected between segments 115a and 115d and a second pattern circuit 154 with a second passive device 152 connected between segments 115b and 115c, which are associated with alternatingly energized A and B phase winding coils 114, in order to remove any stoppage induced from the electrical disconnection and thus stabilize its operation.

That is, each of the A and B phase winding coils 112 and 114 provided in the rotor 110 is formed by coiling a single coil for a number of times, and first and second ends 112a and 112b of the A phase winding coil 112 are electrically connected to the segments 115a and 115c of a predetermined electrical angle θ, respectively, in which the segments 115a and 115c together with the segments 115b and 115d are provided on the underside of the upper board 111 to constitute a rectifier 115.

First and second ends 114a and 114b of the B phase winding coil 114 are connected to the segments 115b and 115d, respectively.

The upper board 111 also has a bypass circuit section 150 for supplying a minimum voltage to the A and B phase winding coils 112 and 114 to generate rotational torque for rotating the rotor 110 from an electrically disconnected section to an electrically connected section at the stoppage of the motor.

That is, the bypass circuit section 150 has a first pattern circuit 153 for electrically connecting the segment 115a connected to the first end 112a of the A phase winding coil 112 with the segment 115d connected to the second end 114b of the B phase winding coil 114, in which the first pattern circuit 153 is of a conductive pattern member printed on the underside of the lower board 111.

The first passive device 151 is provided in a longitudinally intermediate portion of the first pattern circuit 153 to decrease current inputted via an input side before outputting the current via an output side. The first pattern circuit 153 with the first passive device 151 is preferably formed along the shortest path between the segments 115a and 115d which are connected to both ends thereof.

Further, the second pattern circuit 154 is provided to electrically connect the segment 115b connected to the first end 114a of the B phase winding coil 114 with the segment 115c connected to the second end 112b of the A phase winding coil 112, in which the second pattern circuit 154 is also of a conductive pattern member that is printed on the underside of the lower board 111 likewise to the first pattern circuit 153.

The second passive device 152 is provided in a longitudinally intermediate portion of the second pattern circuit 154 to decrease input current from an input side before supplying the current to an output side. The circuit pattern circuit 154 with the second passive device 152 is also preferably formed along the shortest path between the segments 115b and 115c which are connected to both ends thereof likewise to the first pattern circuit 153.

In the vibration motor 100a of the above structure with the bypass circuit section 150 provided in the underside of the upper board 111, voltage is alternatingly applied toward the A phase winding coil 112 and the B phase winding coil 114 during the rotation of the rotor 110 about the stator 120 so as to ensure the motor 100a to normally operate.

That is, as shown in FIG. 10A, when the positive and negative brush fingers 125a and 125b contact the segments 115a and 115c of the rectifier at a preset electrical angle θ, respectively, the segments 115a and 115c in contact with the positive and negative brush fingers 125a and 125b are connected to the first and second ends 112a and 112b of the A phase winding coil 112 to constitute a circuit.

Figure 11A:
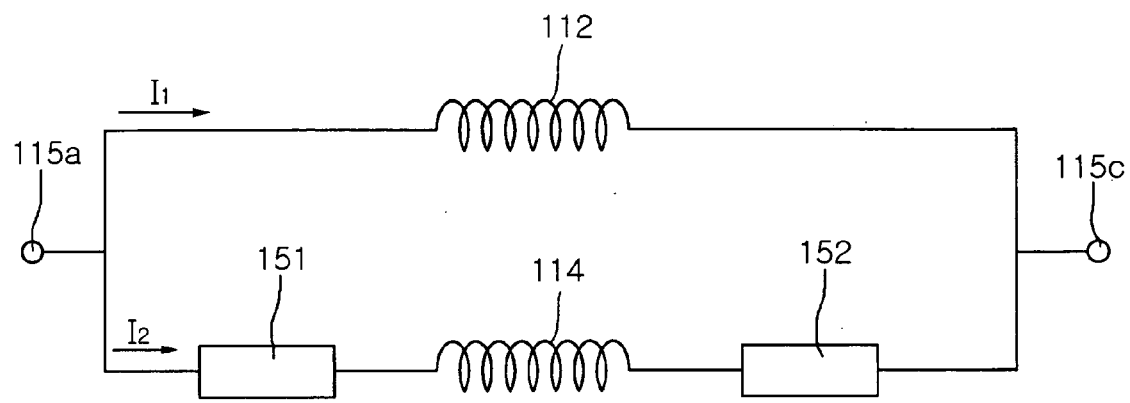

Then, as shown in FIG. 11A, a first portion I1 of input current from the power supply 123 is flown through the A phase winding coil 112 to create forward torque while the remaining portion I1 of the input current of a relatively smaller quantity is flown through the first passive device 151, the B phase winding coil 114 and the second passive device 152. The torque from the B phase winding coil 114 is relatively insignificant compared to that from the A phase winding coil 112, and thus may not have an effect on the motor operation.

In succession, if the positive and negative brush fingers 125a and 125b normally contact the segments 115b and 115d at the preset electrical angle, a majority of the input current flows through the B phase winding coil 114 but a slight quantity of the input current is supplied to the A phase winding coil 112 on the contrary. As a consequence, the alternate current applied to the A and B phase winding coils 112 and 114 forms an electromagnetic field, which in turn interacts with a magnetic field from the magnet 112 to rotate the eccentric rotor 110 about the shaft 131 of the stator 120 thereby creating vibration.

In the meantime, as shown in FIG. 10B, in case that the positive and negative brush fingers 125a and 125b perform abnormal contact offset from the preset electrical angle θ, the positive brush finger 125a contacts the bottom of the segment 115a but the negative brush finger 125b does not contact the bottom of the segment 115c so that the input current from the power supply 123 fails to form a series of current flow directed from the A phase winding coil 112 first end 112a toward the A phase winding coil 112 second end 112b, thereby creating an electrically disconnected section as a factor of the motor 100a stoppage.

Upon the electrical disconnection, the negative brush finger 125b offset from the allowed electrical angle θ abnormally contacts the segments 115b and 115d connected to the first or second end 114a or 114b of the B phase winding coil 114, and the positive brush finger 125a normally contacts the segment 115a connected to the first end 112a of the A phase winding coil 112.

Figure 11B:
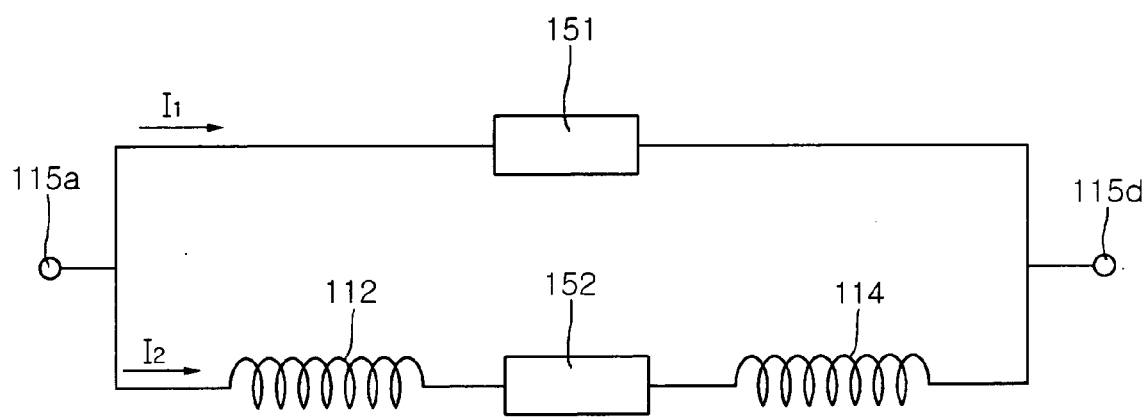
Figure 12:
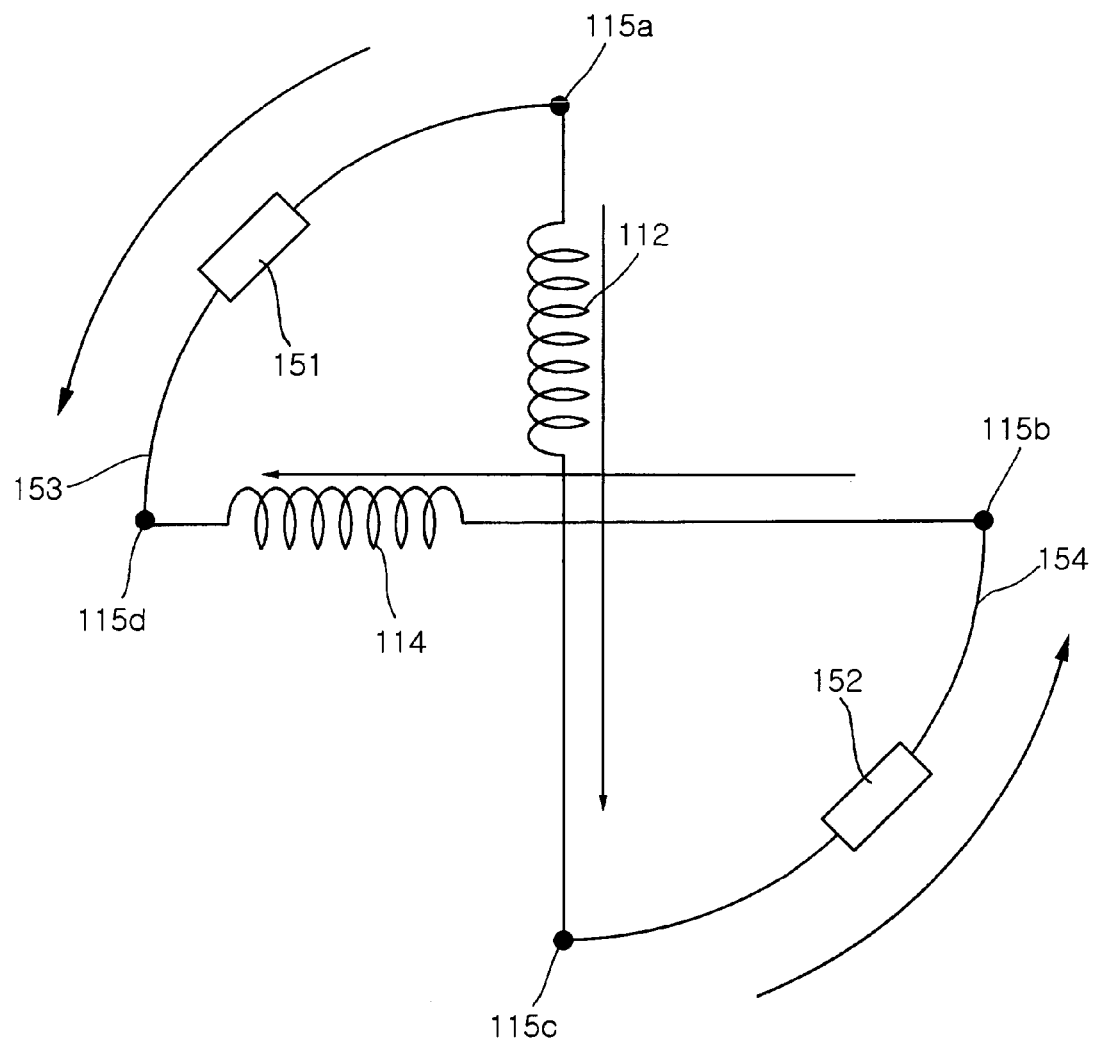
FIG. 12 illustrates a winding coil wired with a pattern coil in the flat type vibration motor according to the second embodiment of the invention.

Therefore, as shown in FIG. 11B, a portion I1 of the input current introduced into the positive brush 125a in contact with the segment 115a flows through the first pattern circuit 153 and the passive device 151 of the first pattern circuit 153, thereby forming a current flow outputting through the segment 115d connected to the second end of the first pattern circuit 153 and the negative brush finger 125b in contact with the segment 115d.

In addition, the remaining portion I2 of the input current introduced into the positive brush 125a in contact with the segment 115a flows through the A phase winding coil 112, the segment 115c connected to the second end of the A phase winding coil 112, the second pattern circuit 154 and the second passive device 152 of the second pattern circuit 154, and then forms a current flow outputting through the B phase winding coil 114 to the segment 115d in contact with the negative brush 125b.

Then, as a result, the input current into the A phase winding coil 112 and the B phase winding coil 114 forms an electromagnetic field, which interacts with a magnetic field from the magnet 122 of the stator 120 to create a rotational torque that is smaller than the rotational torque induced from the normal contact but can instantaneously shift the rotor 110 from the electrically disconnected section to the electrically connected section for undisturbed rotation thereof so that the motor can be stably operated.

Preferably, the first and second passive devices 151 and 152 are provided as resistor means for supplying current with resistance values similar to that of the wires wound on the A and B phase winding coils 112 and 114 so that only a small quantity of current can be supplied to normally rotate the rotor 110 from the electrically disconnected section that instantaneously occurs.

Alternatively, the first and second passive devices 151 and 152 may be provided as inductors for supplying the minimum quantity of current so that only a small quantity of current can be supplied to normally rotate the rotor 110 from the temporarily electrically disconnected section in the operation of the motor.

The inductors preferably have inductance values that are about at least ⅓ of those of the A and B phase winding coils 112 and 114.

That is, the resistor means or the inductors having resistance values similar to the direct current resistance of the coils are adopted as the first and second passive devices 151 and 152 in the first and second pattern circuits 153 and 154, respectively.

Figure 13A:
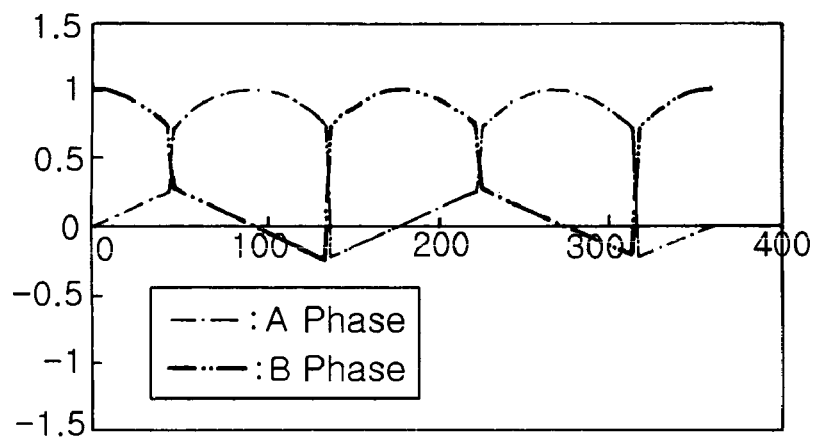
Figure 13B:
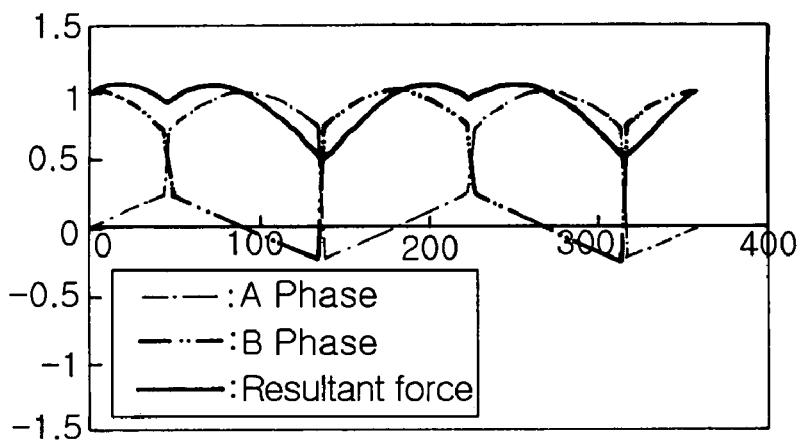

Provided that current normally flowing through the A phase winding coil 112 has a value of 1 in this state, because the B phase winding coil 114 and the two passive devices 151 and 152 are connected in series, current flowing through the B phase winding coil 114 has a value of about ⅓ of that of the A phase winding coil. Also, while the A phase winding coil 112 creates forward torque, the B phase winding coil 114 is divided into a ⅓ section formed along the length thereof for creating forward torque and another ⅓ section formed along the length thereof for creating backward torque as shown in FIGS. 13A and 13B. Then, the winding coils generate an overall resultant torque substantially same as the original torque to prevent any stoppage in the electrically disconnected section. It can be understood that resultant forces of the respective phases constantly produce a positive torque wave profile.

The first and second passive devices 151 and 152 may be provided as capacitors which allow a slight quantity of current to flow therethrough while accumulating electric charge in the application of voltage.

The capacitors are provided as the first and second passive devices 151 and 152 in the first and second pattern circuits 153 and 154 in place of the resistor means or the inductors. When the electrically disconnected section occurs during the rotation of the motor, the minimum quantity of current flows through the capacitors as the first and second passive devices 151 and 152 so that a rotational torque takes place in the rotor 110 to drive the rotor 110 from the electrically disconnected section to the electrically connected section thereby preventing the stoppage.

Figure 13C:
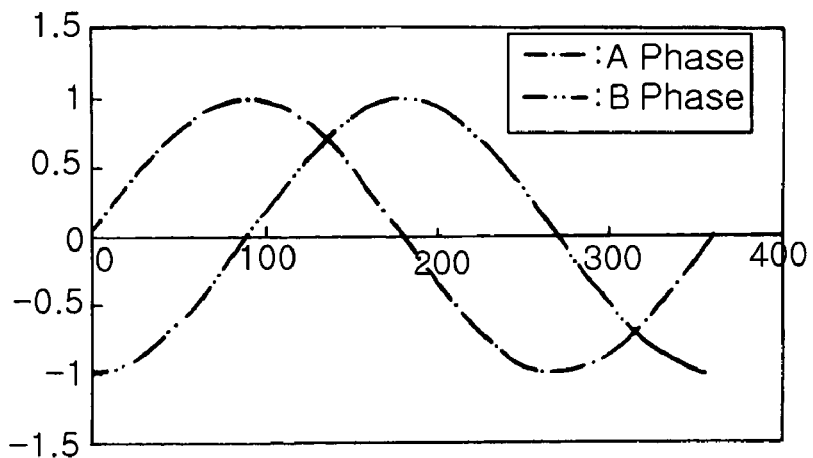

When the capacitors are adopted as the passive devices, there is also provided a wave profile the same as the torque wave profile formed in the winding coils of the two phase vibration motor as shown in FIG. 13C.

According to the present invention as set forth above, the pattern coil for generating an electromagnetic field in the application of voltage is formed between the first end of the A phase winding coil and the second end of the B phase winding coil so that the electric connection via the pattern coil can generate an electromagnetic field for driving the rotor from the electrically disconnected section to the electrically connected section so as to stably maintain the motor operation.

Further, because the passive devices are provided between both ends of the A phase winding coil and both ends of the B phase winding coil to decrease input current to a specific value for generating the minimum quantity of rotation torque, the rotor can be shifted from the electrically disconnected section to the electrically connected section using the minimum quantity of current directed via the passive devices toward the A and B phase winding coils in case of the rotor stoppage originated from any offset electrical angle of the positive and negative brush fingers. This as a result can prevent the stoppage of the motor operation while realizing efficient operation to the motor.

In addition, each winding coil is provided in the form of a single wire to remove the necessity of double winding to simplify an assembly process of the motor and its assembly structure thereby enhancing workability.

While the present invention has been shown and described in connection with the preferred embodiments, it will be apparent to those skilled in the art that modifications and variations can be made without departing from the spirit and scope of the invention as defined by the appended claims.

What is claimed is:

1. A flat type vibration motor comprising:
   a shaft supported between a housing and a bracket assembled to a bottom of the housing;
   a rotor including an upper board arranged within the housing, A and B phase winding coils arranged on a top of the upper board, a weight arranged eccentrically on the top of the upper board adjacent to the winding coils and a rectifier arranged on an underside of the upper board, the rectifier having a plurality of segments electrically connected to first and second ends of the A and B phase winding coils, respectively;
   a stator including a lower board, a magnet arranged on a top of the lower board corresponding to the A and B winding coils and a pair of brush fingers electrically connected to a power supply for receiving external voltage and in contact with the segments; and
   a pattern coil arranged on the upper board for achieving electric connection between one of the segments connected to a first end of the A phase winding coil and another one of the segments connected to a second end of the B phase winding coil in order to generate electromagnetic force for rotating the rotor from an electrically disconnected section to an electrically connected section.

2. The flat type vibration motor according to claim 1, wherein each of the A and B winding coils comprises a single coil member wound in a number of times.

3. The flat type vibration motor according to claim 1, wherein the upper board comprises a printed circuit board with the segments and the pattern coil being printed on an underside thereof.

4. The flat type vibration motor according to claim 1, wherein the rotor further includes an insulator formed on the top of the upper board for integrally molding the winding coils and the weight therein.

5. The flat type vibration motor according to claim 1, wherein the lower board comprises a printed circuit board having a pattern circuit printed on a top thereof for electrically connecting the power supply with the brush fingers.

6. The flat type vibration motor according to claim 1, wherein the magnet comprises an annular magnet member having N and S poles radially magnetized in an alternating fashion.

7. The flat type vibration motor according to claim 1, wherein the pattern coil comprises at least one coil formed in the underside of the upper board corresponding to an either one of the A and B winding coils.

8. The flat type vibration motor according to claim 7, wherein the pattern coil formed on the underside corresponding to an either one of the A and B winding coils is wound in a direction the same as that of the corresponding winding coil.

* * * * *